US009333596B2

(12) United States Patent
Luis y Prado

(10) Patent No.: US 9,333,596 B2
(45) Date of Patent: May 10, 2016

(54) WELDING SUPPORT SYSTEM

(71) Applicant: Workshops for Warriors, San Diego, CA (US)

(72) Inventor: Hernán Luis y Prado, San Diego, CA (US)

(73) Assignee: Workshops for Warriors, San Diego, CA (US)

( * ) Notice: Subject to any disclaimer, the term of this patent is extended or adjusted under 35 U.S.C. 154(b) by 0 days.

(21) Appl. No.: 14/206,110

(22) Filed: Mar. 12, 2014

(65) Prior Publication Data

US 2014/0265776 A1   Sep. 18, 2014

Related U.S. Application Data

(60) Provisional application No. 61/777,788, filed on Mar. 12, 2013.

(51) Int. Cl.
*B23K 37/02* (2006.01)

(52) U.S. Cl.
CPC ................................. *B23K 37/0294* (2013.01)

(58) Field of Classification Search
CPC .... B23K 37/0294; B23K 9/327; B23K 37/02; B23K 37/0205; B23K 37/0282; B23K 37/0288; B23K 37/0461; B25H 1/00; B25H 1/0021; B25H 1/04; B25H 3/04; B62B 2202/022; B62B 3/02; B62B 3/10
USPC ........... 280/79.11, 79.3; 414/331.06; 219/136
See application file for complete search history.

(56) References Cited

U.S. PATENT DOCUMENTS

| 4,496,822 | A  | * | 1/1985  | Jegers et al. ................ 219/125.1 |
| 4,625,949 | A  | * | 12/1986 | Walker ............................. 266/48 |
| 5,662,451 | A  | * | 9/1997  | Muzzi et al. ................... 414/540 |
| 6,619,065 | B1 | * | 9/2003  | Burton et al. .................... 62/292 |
| 6,871,921 | B2 | * | 3/2005  | Ernst ........................... 312/348.3 |
| 6,893,201 | B2 | * | 5/2005  | Clery ............................ 414/490 |
| 6,992,266 | B1 | * | 1/2006  | Di Novo et al. ............ 219/137.9 |

(Continued)

FOREIGN PATENT DOCUMENTS

| CN | 202655811 U | 1/2013 |
| JP | 09-192884 A | 7/1997 |

(Continued)

OTHER PUBLICATIONS

International Search Report and Written Opinion of the International Searching Authority issued in International Application No. PCT/US2014/024283 on Jul. 10, 2014; 13 pages.

*Primary Examiner* — John Walters
*Assistant Examiner* — Brian Swenson
(74) *Attorney, Agent, or Firm* — Fish & Richardson P.C.

(57) ABSTRACT

A welding support system, for example, formed as a wagon or cart, includes at least one shelf having configurable support components for supporting different configurations of welding equipment, and legs interconnecting the shelve. The at least one shelf is angled in a manner that provides enhanced visibility of and/or access to welding equipment supported thereon.

20 Claims, 10 Drawing Sheets

(56) References Cited

U.S. PATENT DOCUMENTS

| | | | |
|---|---|---|---|
| 7,114,732 B1* | 10/2006 | Ismail | 280/47.34 |
| 7,172,207 B2* | 2/2007 | Henry | 280/651 |
| 7,326,879 B2* | 2/2008 | Andersen et al. | 219/130.1 |
| 7,357,398 B2* | 4/2008 | O'Connor | 280/47.34 |
| 8,162,190 B2* | 4/2012 | Hanson et al. | 224/404 |
| 8,536,488 B2* | 9/2013 | Ertmer et al. | 219/136 |
| 2006/0043081 A1 | 3/2006 | Martin | |
| 2007/0182114 A1* | 8/2007 | Fernandes et al. | 280/47.35 |
| 2009/0097957 A1* | 4/2009 | Cramer et al. | 414/801 |
| 2013/0056431 A1* | 3/2013 | Lin | 211/59.2 |

FOREIGN PATENT DOCUMENTS

| | | |
|---|---|---|
| KR | 20-0237327 Y1 | 9/2001 |
| KR | 20-2010-0009529 U | 9/2010 |

* cited by examiner

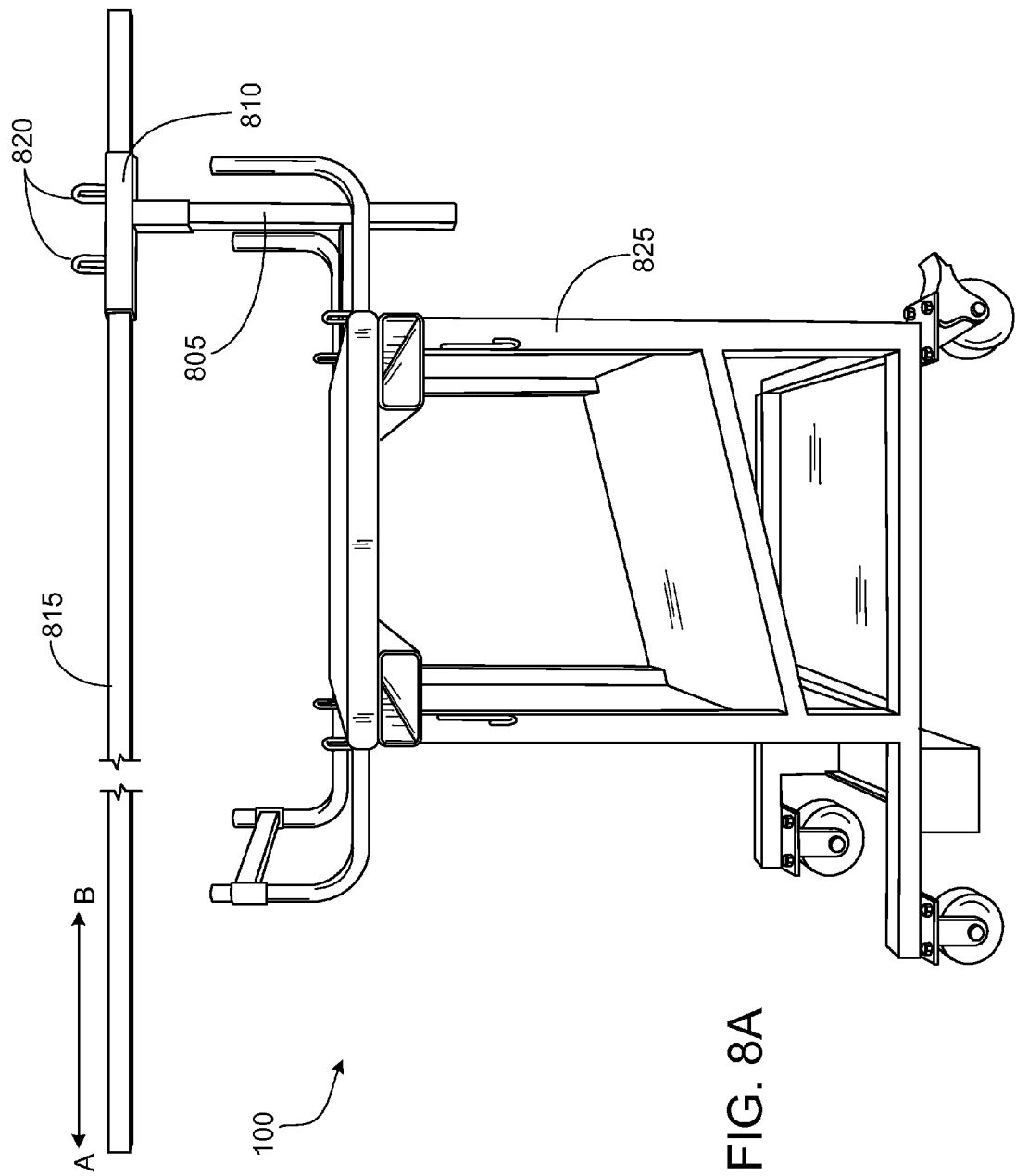

WELDING SUPPORT SYSTEM

CROSS REFERENCE TO RELATED APPLICATIONS

This application claims the benefit under 35 U.S.C. §119(e)(1) of U.S. Provisional Patent Application No. 61/777,788, filed on Mar. 12, 2013, which is incorporated by reference herein.

TECHNICAL FIELD

This specification relates to welding support equipment, such as used to facilitate different types of welding.

BACKGROUND

Welding is a fabrication or sculptural process that joins materials, usually metals or thermoplastics, by causing coalescence. This is often done by melting the workpieces and adding a filler material to form a pool of molten material (the weld pool) that cools to become a strong joint, with pressure sometimes used in conjunction with heat, or by itself, to produce the weld. Many different energy sources can be used for welding, including a gas flame, an electric arc, a laser, an electron beam, friction, and ultrasound. Different types of welding include Gas Tungsten Arc Welding (sometimes referred to as TIG or GTAW welding), Water Cooled welding, Gas Metal Arc Welding (sometimes referred to as MIG or GMAW welding), Shielded Metal Arc Welding (sometimes referred to as STICK or SMAW welding), Oxygen and Acetylene welding (sometimes referred to as Oxy/Acetylene welding), and Plasma Torch welding. Generally speaking, different types of welding require different items of associated equipment of varying shapes, sizes and usage parameters.

SUMMARY

This specification describes a welding support system, for example, implemented as a wagon or cart, that may include at least one shelf having configurable support components for supporting different configurations of welding equipment, and legs interconnecting the shelf. The at least one shelf is angled in a manner that provides enhanced visibility of and/or access to welding equipment/instrumentation supported thereon. The system may further include one or more of removable wheels, handles formed as bullhorn hooks, and lifting eyes.

The system may include a tool-less tank restraint comprising one or more tank receiving recesses, a rotatable cross-bar, and a tightening lever.

The system may include a telescoping boom configured to telescope from, and retract into, one of the legs, the telescoping boom further configured to hold one or more cables at a height of the boom.

The system may further include integrated forklift pockets configured to accommodate the forks of a standard forklift.

Particular implementations of the subject matter described in this specification may be configured to realize various potential advantages. For example, by providing a welding support system having a customizable, modular middle shelf, many different types, sizes, shapes and configurations of welding equipment may be facilitated. In addition, angling the middle shelf significant enhances the ease with which the welding equipment disposed thereon can be viewed and accessed. Providing a tool-less tank restraint system enhances the speed and ease with which gas tanks may be loaded and/or replaced on the welding support system. Providing a telescoping cable guiding boom helps keep welding cables and leads off the floor, and optionally above the welder's head, thereby reducing the risks of tripping, entanglement and/or other potential hazards. Providing the welding support system with integrated forklift pockets enables the system to easily, quickly and safely be transported by a forklift. Similarly, integrated lifting eyes enable the welding support system to be hooked and hoisted into the air as needed (e.g., for theft prevention purposes, for loading onto a ship, or oil platform) particularly suitable in shipyard or oil platform environments. Having system handles formed as bullhorn hooks facilitates the dual purpose of providing robust handles for manipulating or moving the cart as well as providing convenient hooks for holding various items of equipment. Removable wheels on the welding support system enable the system to be mobile when desired but also, when the wheels are removed and replaced with fixed feet, used in a stationary environment. Having the upper and lower shelves recessed, and/or potentially enclosed with a lockable closure, enables personnel to safely and securely store welding materials and other supplies without fear of theft and allows all necessary tools and supplies to be within reach of the operator which results in a significant time savings.

Details of one or more implementations of the subject matter described in this specification are set forth in the accompanying drawings and the description below. Other features, aspects, and potential advantages of the subject matter will become apparent from the description, the drawings, and the claims.

BRIEF DESCRIPTION OF THE DRAWINGS

FIG. 8A is a right-side view of a welding support system.

Like reference numbers and designations in the various drawings indicate like elements.

DETAILED DESCRIPTION

The present inventor recognized the potential benefits and advantages in providing a mobile, self-contained welding support system that, among other things, holds and transports, in a secure, convenient and safety-enhancing manner, essentially all of the welding and peripheral equipment and supplies needed by a commercial, industrial, and/or shipyard welder during a typical 8-12 hour work shift.

Figure 1:
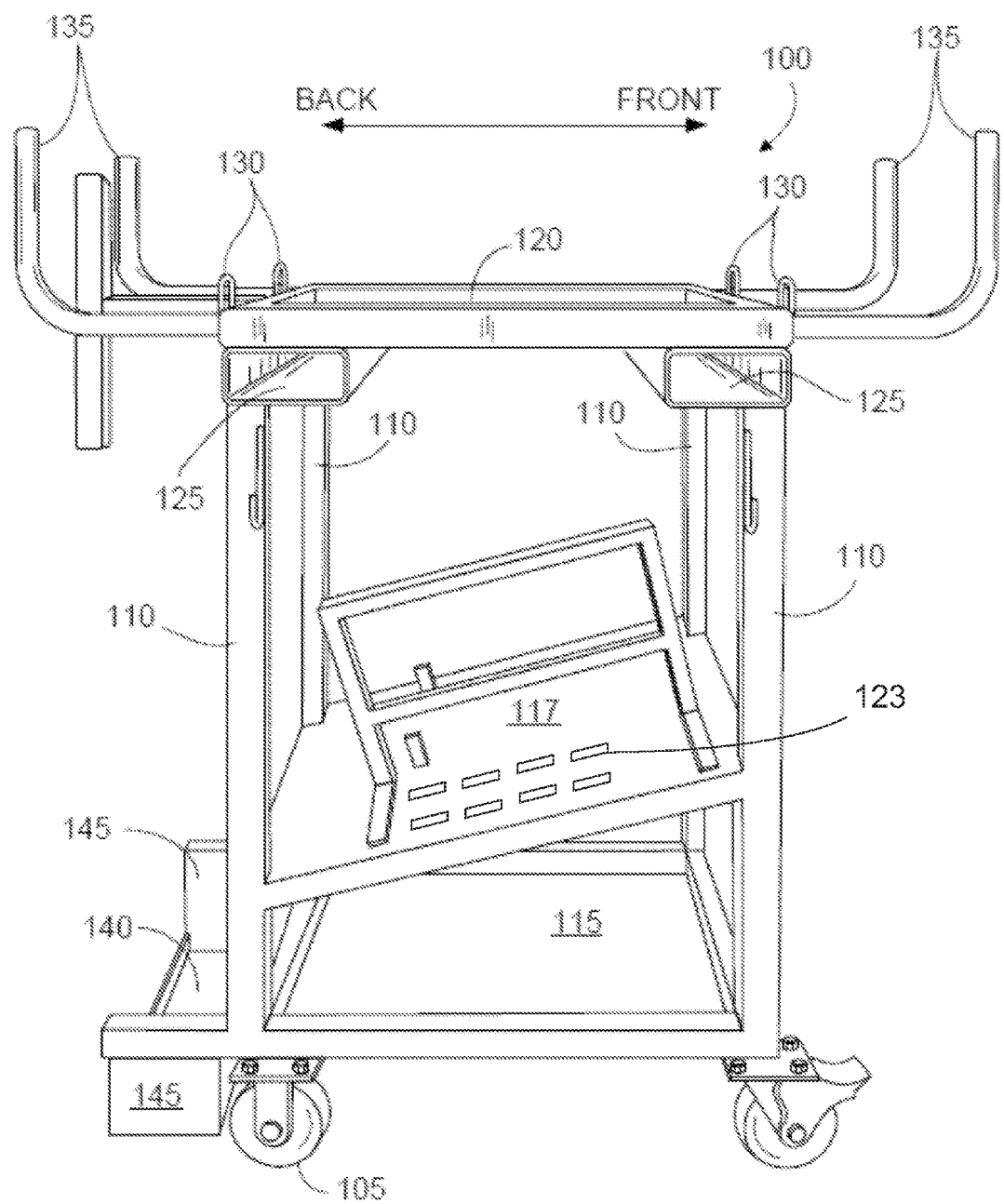
FIG. 1 is a right-side view of a welding support system.

FIG. 1 shows a right-side view of a welding support system 100, in this example implemented as a mobile wagon, having a set of four caster wheels 105, two of which (in front, corresponding to the right side of the figure) swivel thereby enabling the system 100 to be moved and steered by a single person. In addition, the wheels 105 may optionally be removed and replaced with fixed feet (not shown), which may be useful, e.g., if the system 100 is to be used in a shipyard environment or other stationary setting. The frame of the system 100 is formed from vertical support members 110 a rectangular top shelf 120, a rectangular bottom shelf 115, and a rectangular middle shelf 117. In the illustrated configuration, the system also includes forklift pockets 125, into which the forks of a standard forklift may be inserted so that the system 100 can be lifted and moved by the forklift to a desired location, which might not otherwise be reachable by pushing the system 100 on its wheels 105.

The system 100 also includes lifting eyes 130, disposed on each corner of top shelf 120, to which, e.g., crane hooks can be attached to hoist the system 100 in the air, e.g., either to lift the system 100 aboard a ship or the like, or simply to hoist the system 100 in the air out of human reach to avoid pilfering or mischievous use of the equipment supported by the system 100. In addition, the system 100 includes bullhorns 135, which not only act as handles for the system 100, but also serve as convenient and sturdy hooks on which to hang items such as welding cables, hats, masks, coats and the like.

As shown, the system 100 includes a rectangular storage shelf 140 having sidewalls 145 for holding items such as cylinders of compressed air or other gas (not shown). The storage area 140, which in this configuration accommodates two large gas cylinders, sits behind the rear wheels 105 and is about 1.5 inches above ground level.

Figure 2:
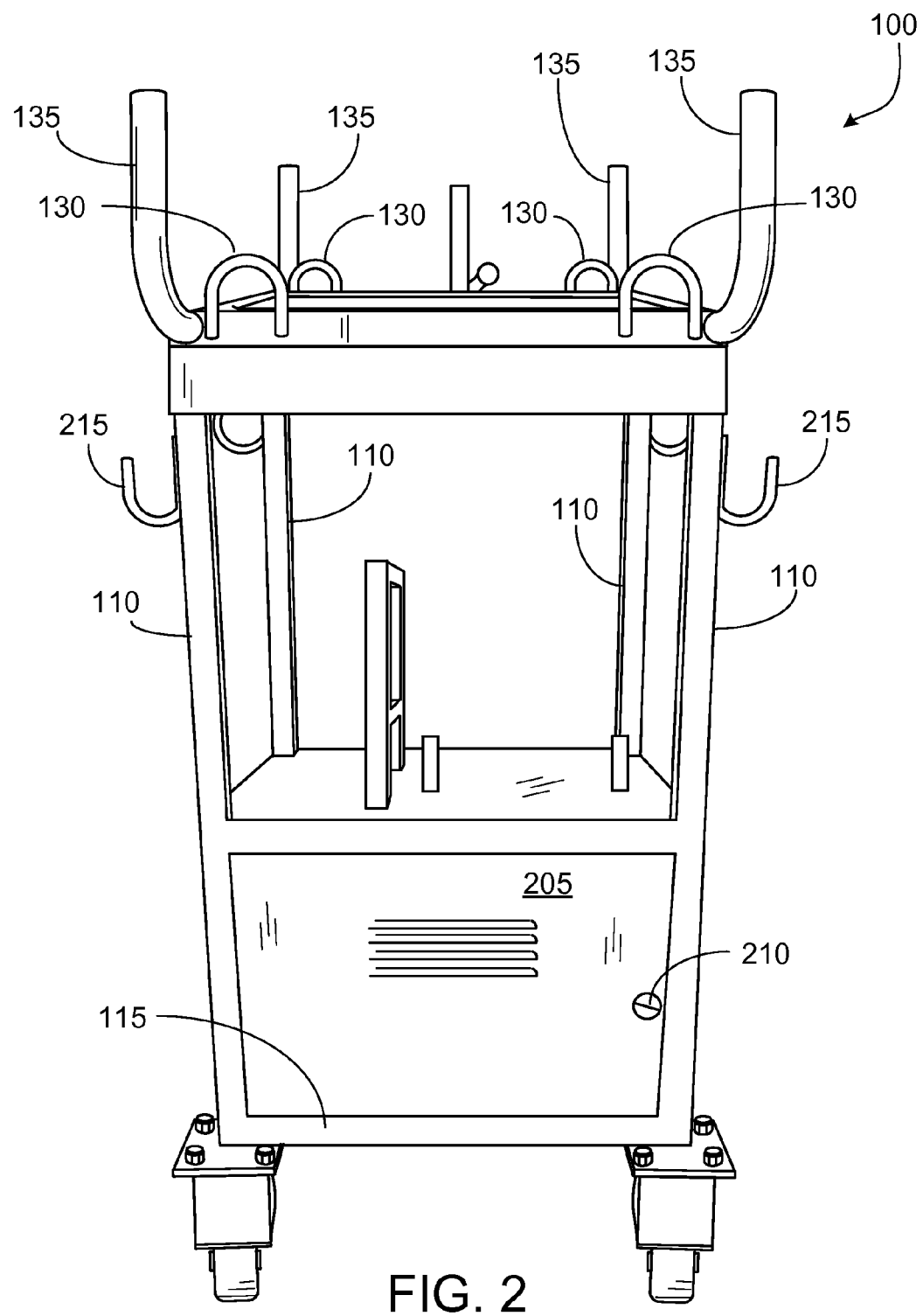
FIG. 2 is a front view of a welding support system.

FIG. 2 shows a front view of the welding support system 100 in which the bottom shelf 115 is configured as an enclosed locker which is formed by fixed walls (not shown) on three of its sides (left, right, back) and a lockable door 205 having a lock mechanism 210. This locker configuration allows the welder to lock away, and thereby secure, personal effects and/or supplies, while away from the system 100.

On the left and right-hand sides of the system 100, lead holders 215 are disposed. These lead holders 215, formed as U-shaped hooks, are designed to support cabling or leads and/or serve as general purpose hooks on which the welder can hang gear such as welding masks, gloves, jacket and the like.

Figure 3:
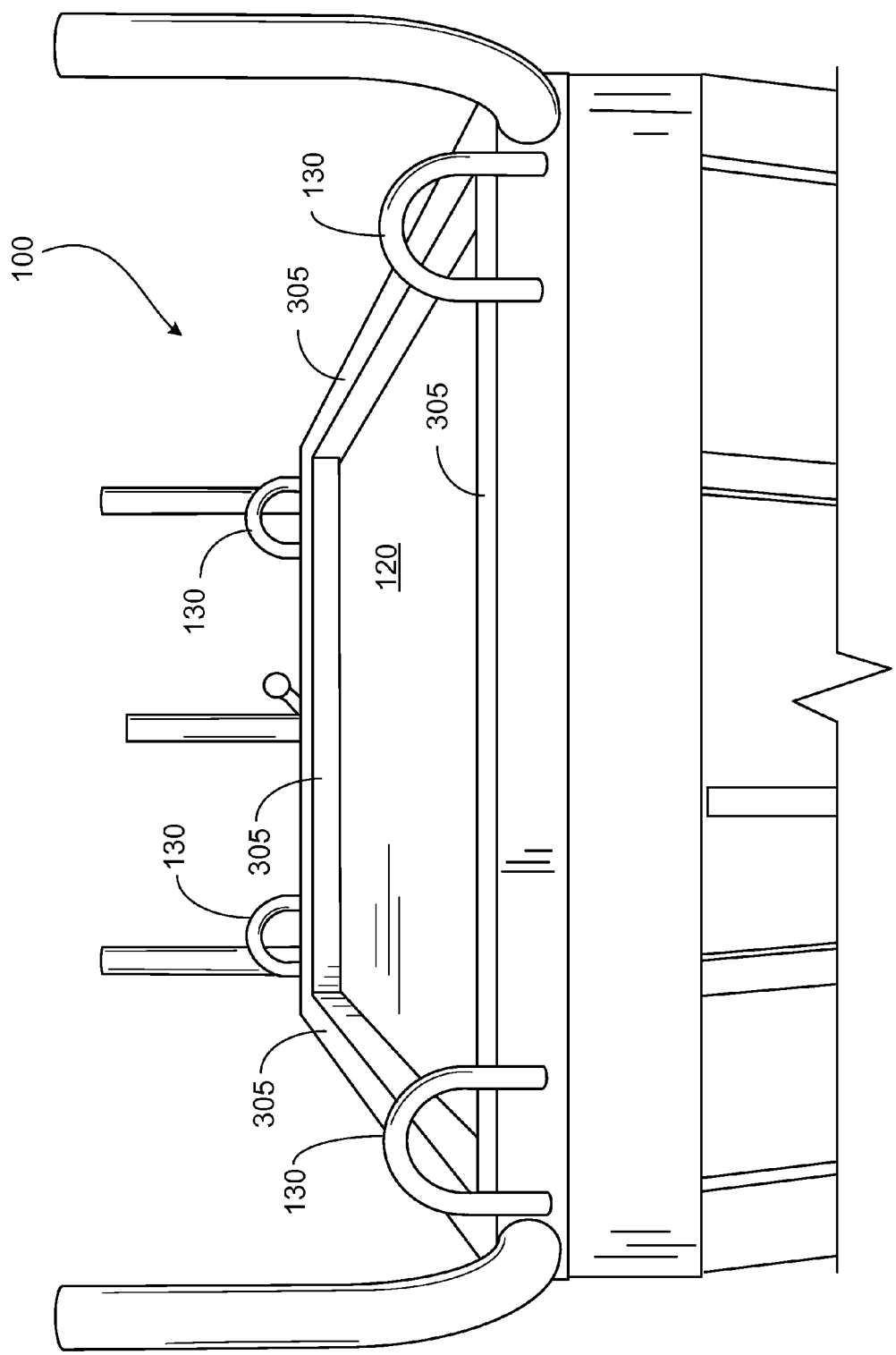
FIG. 3 is a front perspective view of a welding support system.

FIG. 3 is a perspective view of the welding support system 100 showing the top shelf 120, which in this configuration is recessed to prevent work pieces and the like from rolling or otherwise falling off the top of the system, e.g., while it is being pushed or otherwise transported. The recess is formed by four one- and a half inch-square bars 305 affixed together at their ends along the periphery of the top shelf 120. Although not shown in FIG. 3, a welding work surface can be affixed by one or more hinges to one of the bars 305 to provide a surface upon which welding may be performed, while still providing the recess in which to hold work pieces (i.e., between the welding work surface and the top shelf 120).

Figure 4:
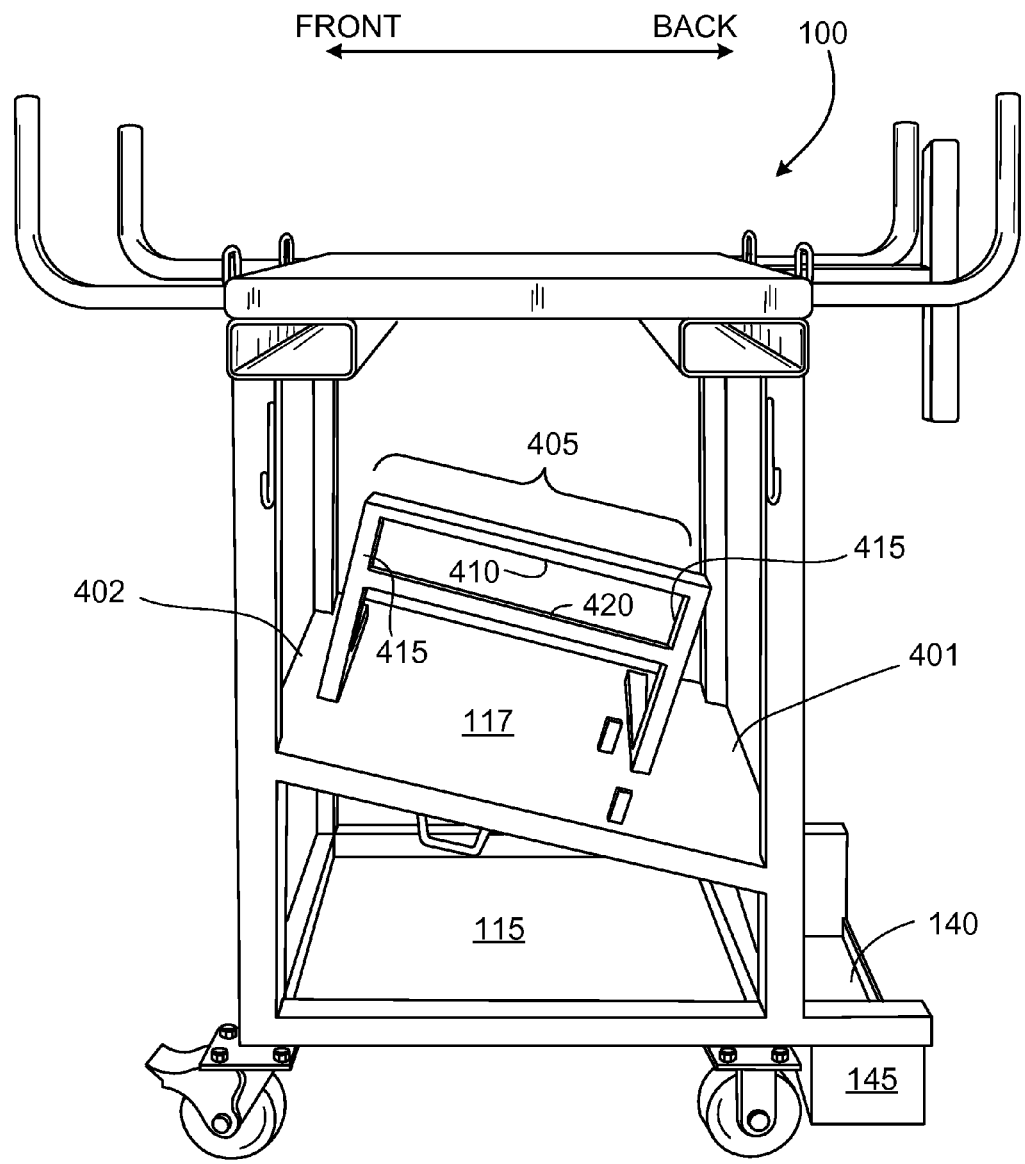
FIG. 4 is a left-side view of a welding support system.
Figure 5:
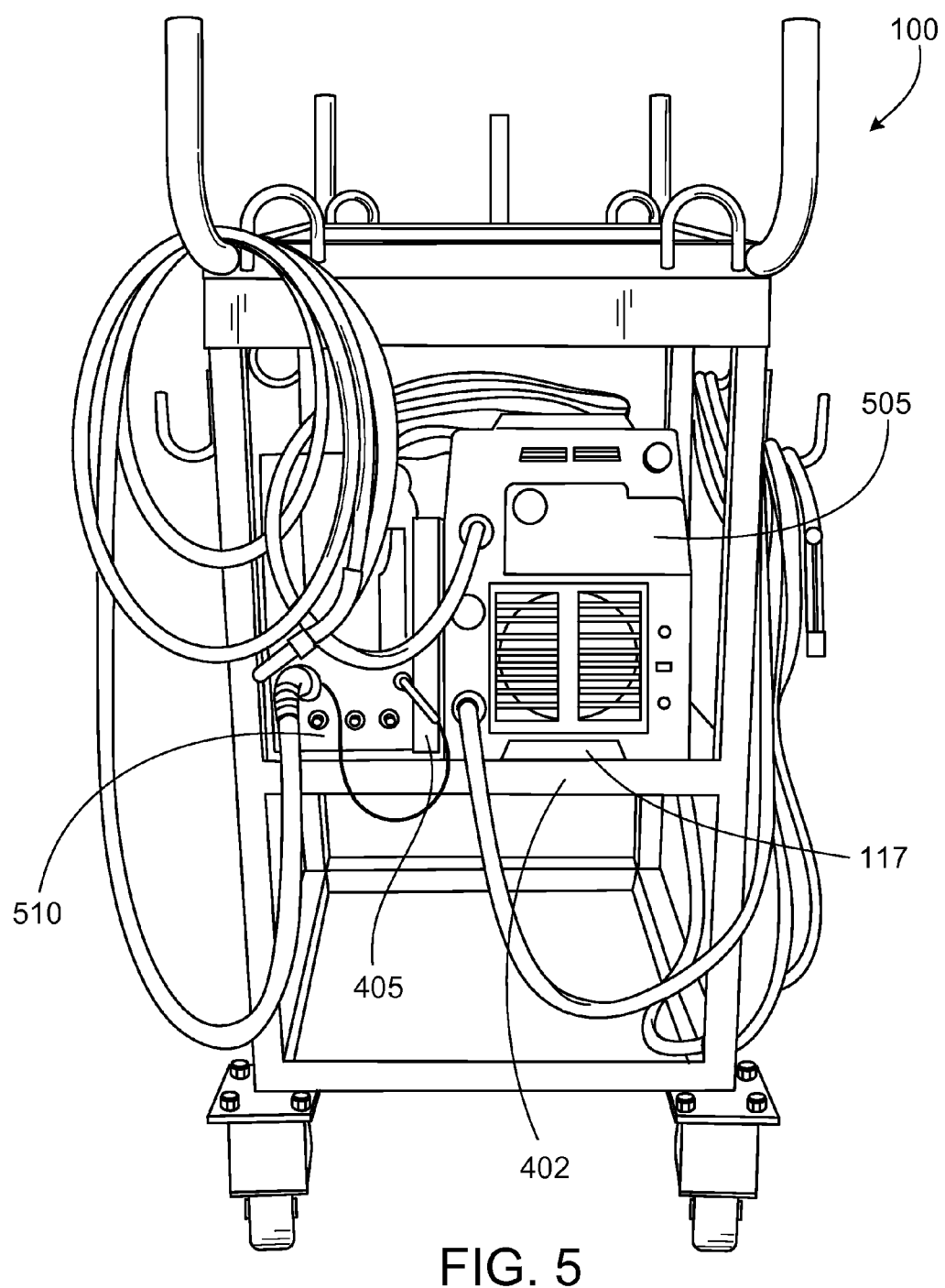
FIG. 5 is a front view of a welding support system.

FIG. 4 is a left-side view of the welding support system 100 showing the middle shelf 117, which is formed at an angle, front-to-back, with the front edge 402 being higher than the back edge 401. As can be seen in FIG. 5, which is a front view of the welding support system 100, the angle of the middle shelf 117 provides the welder with enhanced access to and/or visibility of any welding equipment 505, 510 positioned on the middle shelf 117.

As further can be seen in FIG. 4, middle shelf 117 includes an optional partition 405 that is formed of two vertical support bars 415 affixed to the top surface of the middle shelf 117, and two cross-bars (namely, middle cross-bar 420 and top cross-bar 410) affixed between the vertical support bars. The partition 405, which effectively creates a left-hand side and a right-hand side of the middle shelf 117, serves to separate, and/or provide secure retention of, welding equipment that is positioned in each of the left and right-hand sides. In addition, as can be seen in FIG. 5, the partition 405 is disposed on the middle shelf 117 at a position such that the left-hand side of middle shelf 117 is larger than the right-hand side of middle shelf 117. Among other benefits, this positioning enables the system to accommodate most standard sizes of welding equipment (i.e., not only welding machines but also peripheral equipment such as power sources, suitcase feeders and air coolers). In that regard, the specific equipment shown in FIG. 5 includes a power source 505 and a suitcase welder 510. In a variation of the system 100, the partition 405 can be movable so that the relative sizes of the right and left-hand sides of the middle shelf 117 can be varied.

Other variations may involve (i) making the partition 405 completely removable to make the entire width of middle shelf 117 available to hold a single large piece of equipment, (ii) using shorter partitions, for example, stubs that may be only an inch or more in height, (iii) forming a pattern of slots 123 (FIG. 1) on the middle shelf 117 into which angle iron pieces may be bolted or otherwise fastened to provide a customizable and configurable mechanism for forming various patterns to hold different shapes and sizes of welding equipment. In general, the middle shelf 117 can be implemented to be highly configurable to accommodate many different types, sizes and shapes of welding equipment.

Figure 6:
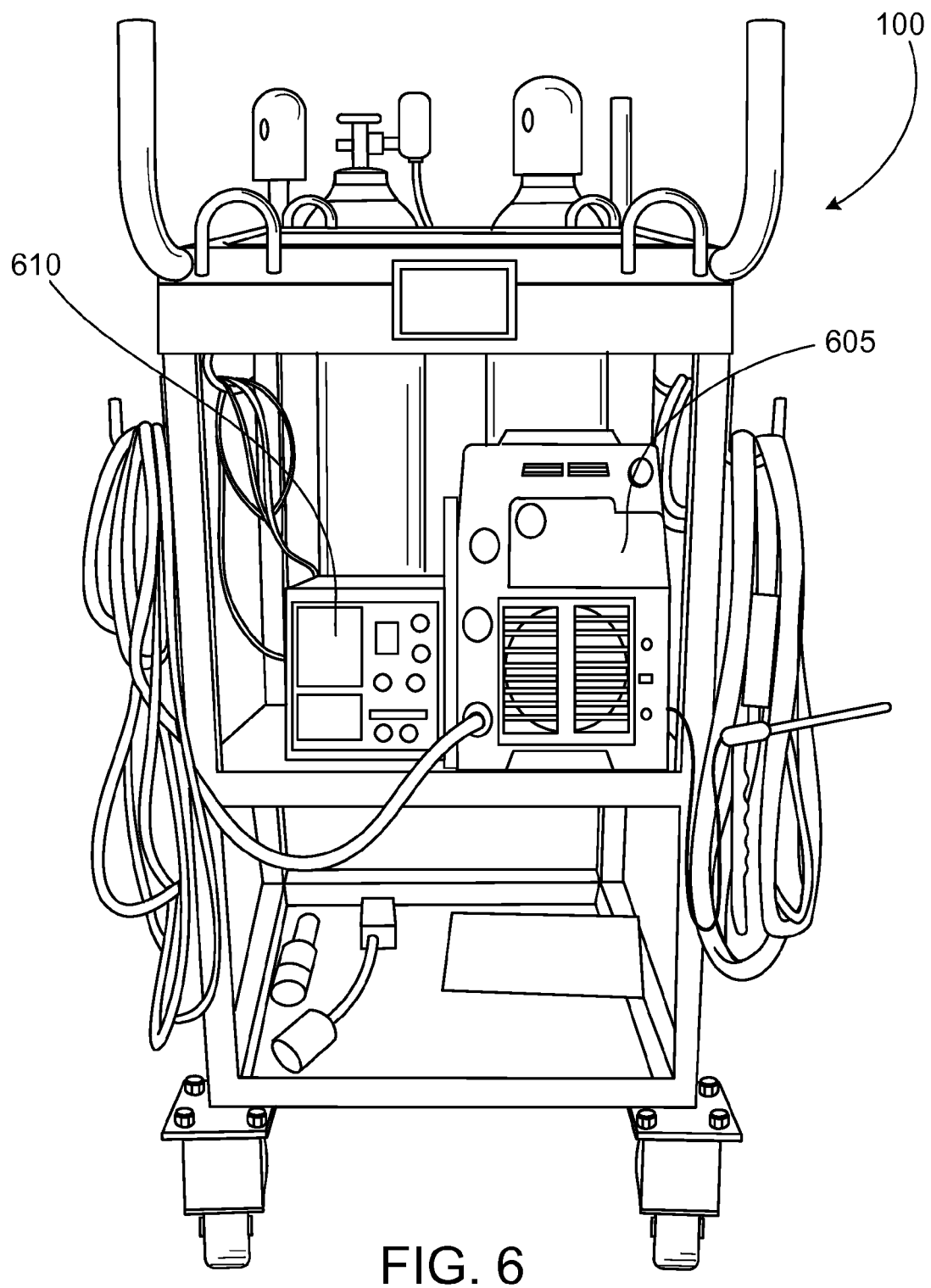
FIG. 6 is a front view of a welding support system.

FIG. 6, which is a front view of the welding support system 100, shows one of many possible configurations of the system 100, namely, with the middle shelf 117 configured to support a TIG welding machine 605 and an accompanying water cooler 610, one of several different types of welding machine accessories.

Figure 7A:
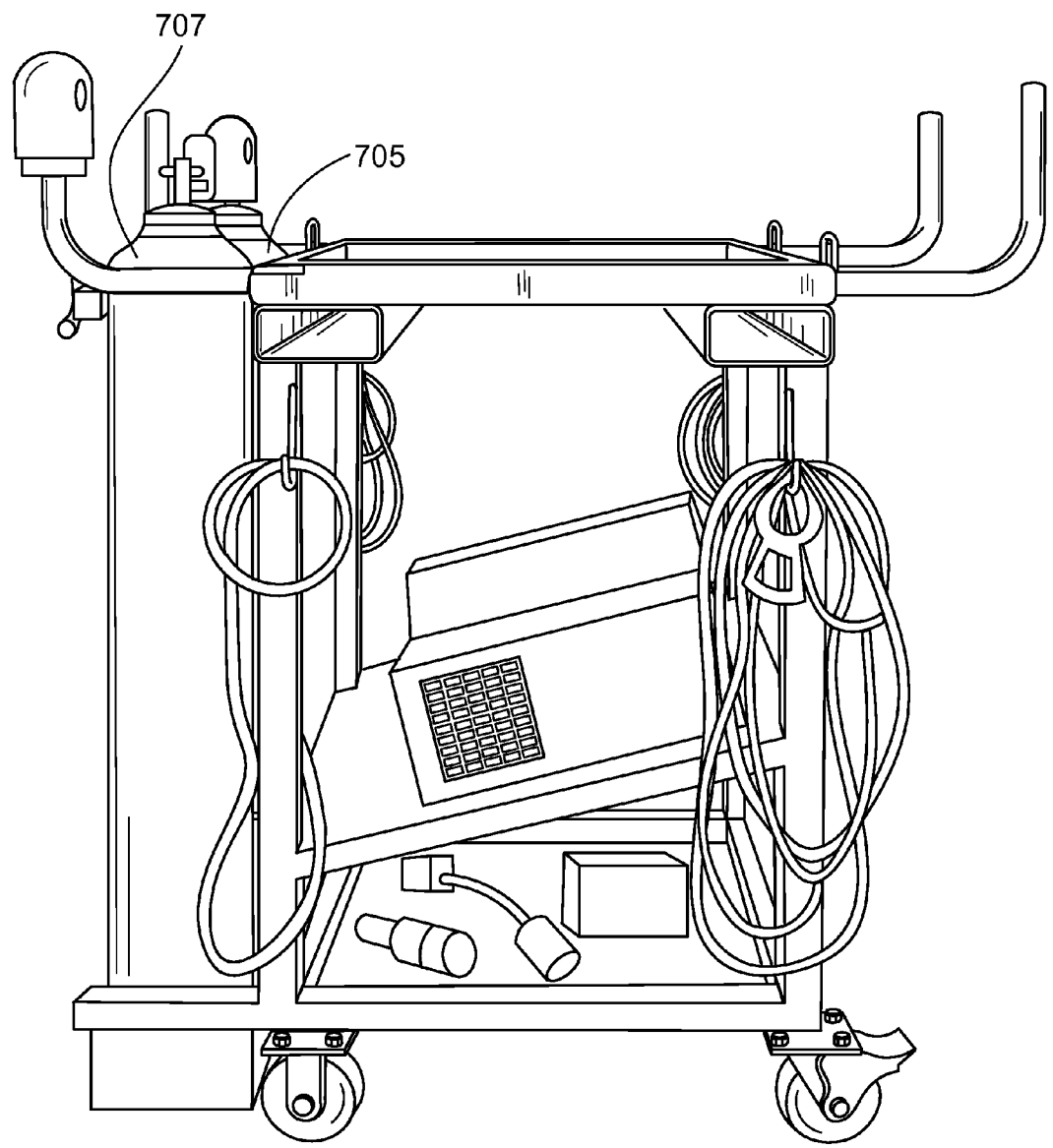
FIG. 7A is a right-side view of a welding support system.
Figure 7B:
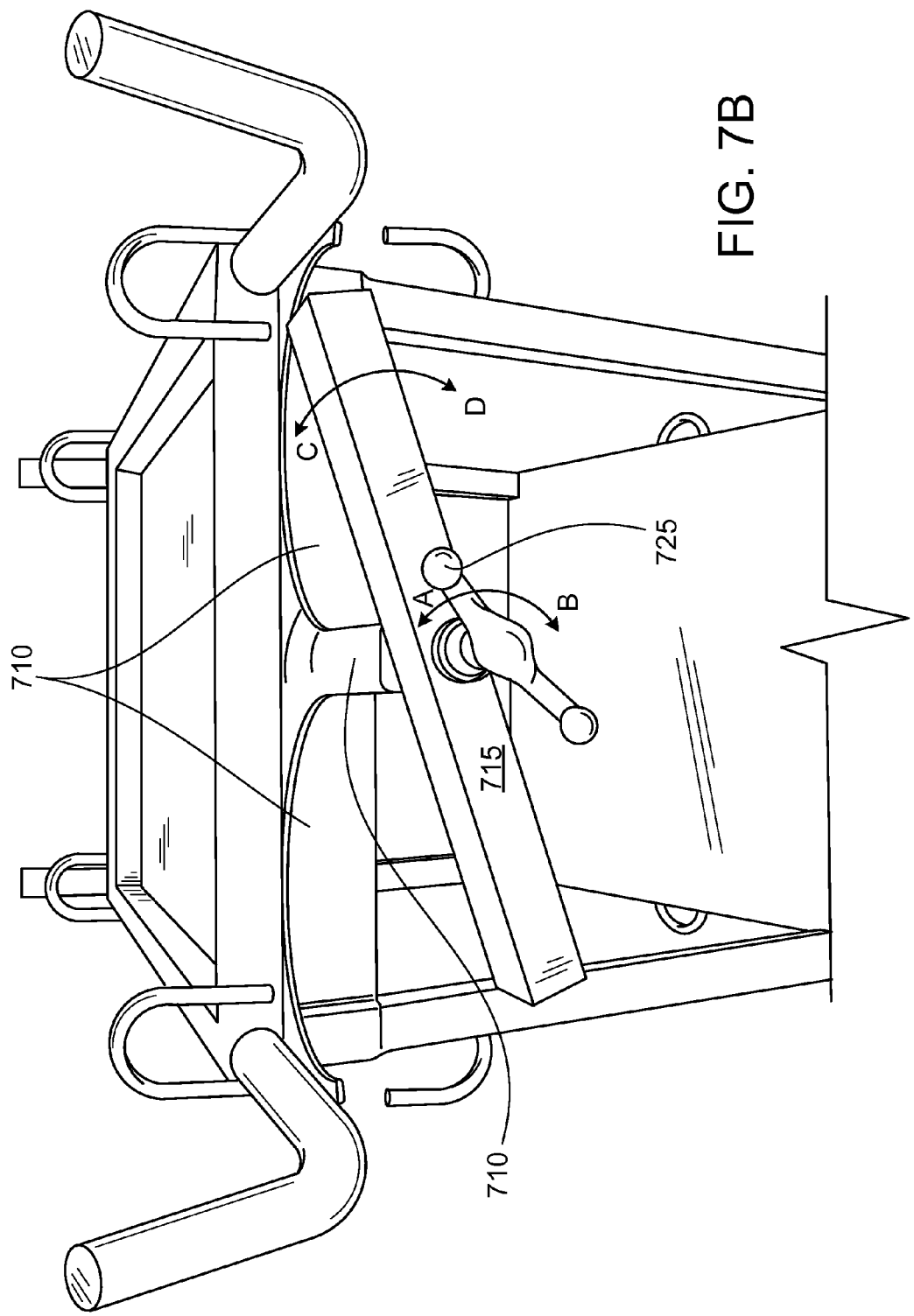
FIG. 7B is a front perspective view of a welding support system.

FIGS. 7A and 7B, which respectively are a right side view and a rear view of the welding support system 100, illustrate aspects of the system's tool-less tank restraint, which is designed to securely hold and support two tanks 705, 707, which typically contain compressed gas used for welding. As shown in FIG. 7B, the tool-less tank restraint is formed of two concave, semi-circular recesses 710, each one configured to accommodate a respective tank. Between the recesses 710, a lever axis arm 720 extends rearward terminating in a lever handle 725, which is rotatably connected to the lever axis arm 720 by means of a threaded screw (not visible). Lever handle 725 can be rotated in directions A and B causing it to rotate on the threaded screw and either tighten (i.e., move toward lever axis arm 720) when rotated in direction B or loosen (i.e., move away from lever axis arm 720) when rotated in direction A.

When positioned in the recesses 710, the tanks 705, 707 are held in place by a rotatable cross-bar 715, which can be rotated in directions C and D. To load the tanks 705, 707, an operator turns lever handle 725 in direction A to loosen it sufficiently such that cross-bar 715 can be freely rotated in either direction C or D. Then, the operator rotates cross-bar 715 in direction C until it is in a substantially vertical orientation, thereby providing unhindered access to the recesses 710. Next, the operator inserts tanks 705, 707 into respective ones of recesses 710, rotates the cross-bar 715 in direction D to cause it to assume a horizontal position, and then rotates lever handle 725 in direction B until the level handle 725 sufficiently tightens to cause cross-bar 715 to come in contact with, and provide an urging force against, both of the tanks 705, 707, thereby holding the tanks 705, 707 in a secure manner to facilitate, e.g., safe transport of the welding support system 100. Accordingly, the tool-less tank restraint provides several potential advantages including, e.g., the ability to quickly and easily exchange, load and hold tanks in a safe and secure manner.

Figure 8B:
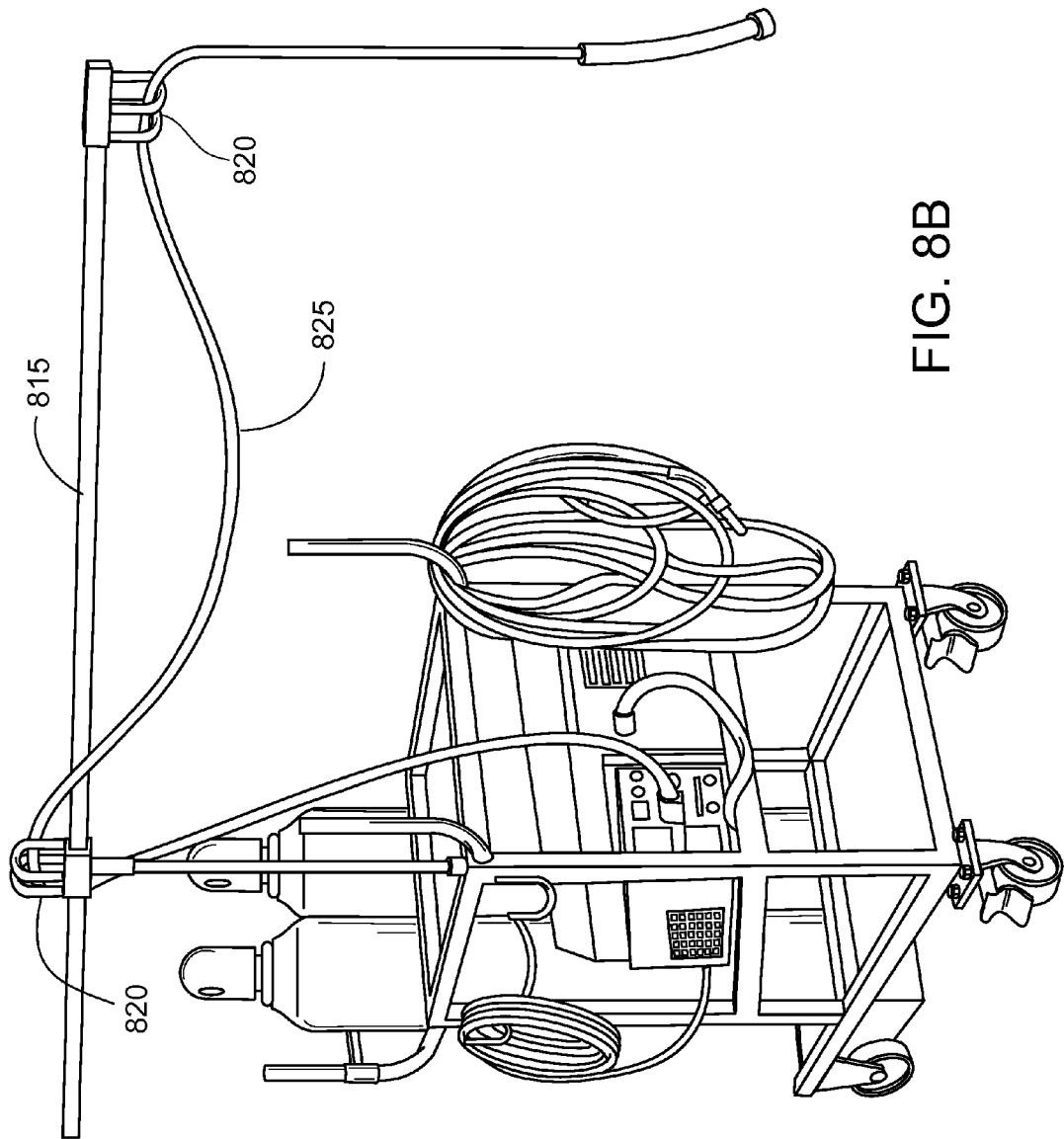
FIG. 8B is a front perspective view of a welding support system.

FIGS. 8A and 8B, which respectively are a right side view and a front perspective view of the welding support system 100, illustrate another safety and convenience-enhancing feature of the system 100, namely, a telescoping cable boom 815 that can be raised or lowered as desired and which, in its raised state, can hold cables and leads over the head of the welder so that the cables and leads do not pose a risk of tripping or entanglement. In an implementation, the cable boom 815 is formed as a one inch square tube, which is operatively connected to a retractable mast 805 by means of an angle bracket 810, which can be freely rotated (thereby rotating the boom 815) about the mast 805 in 360 degrees. The boom 815 can be raised or lowered by respectively extending or retracting the mast 805, which slip-fits inside leg 825 of the system 100. In addition, the boom 815 can be moved back and forth (in directions A and B) relative to the angle bracket 810.

As can be seen in FIG. 8B, the mast 805 can be raised sufficiently high so that the boom 815 is above head-height—that is, high enough so that a welder can walk underneath the boom 815 without hitting his or her head on the boom 815. In addition, the welding lead 825 can be fed through the cable guides 820, effectively causing the lead 825 to remain in relatively close proximity to the boom 815 such that the lead 825 is held above head-height. As a result, the welder can work and move about the welding support system 100 as needed without having to worry about tripping over, or becoming entangled with, the lead 815.

Particular implementations of the subject matter have been described. Other implementations are within the scope of the following claims.

The invention claimed is:

1. A welding support system comprising:
   a plurality of shelves, including a horizontal, top rectangular shelf and at least one middle rectangular shelf having configurable support components for supporting different configurations of welding equipment, wherein the at least one middle rectangular shelf is positioned below the top rectangular shelf and is angled relative to the horizontal, top rectangular shelf; and
   a plurality of legs interconnecting the plurality of shelves, wherein a front edge of the at least one middle rectangular shelf is attached to a pair of the plurality of legs at a first location and a back edge of the at least one middle rectangular shelf is attached to an opposite pair of the plurality of legs at a second location that is lower than the first location.

2. The system of claim 1, wherein the at least one middle rectangular shelf is angled in a manner that at least partially elevates welding equipment supported on the at least one middle rectangular shelf.

3. The system of claim 1, further comprising a plurality of removable wheels, each removable wheel attached to a respective leg of the plurality of legs.

4. The system of claim 1, further comprising a plurality of handles attached to two or more edges of the top rectangular shelf, wherein a handle is formed as a bullhorn hook.

5. The system of claim 1, further comprising a plurality of lifting eyes attached to at least one edge of the top rectangular shelf.

6. The system of claim 5, wherein a lifting eye has an inverted U-shape.

7. The system of claim 1, further comprising a partition formed on the middle rectangular shelf to define a left side and a right side of the middle rectangular shelf.

8. The system of claim 7, wherein the partition comprises:
   a plurality of vertical support bars affixed to a top surface of the middle rectangular shelf; and
   a plurality of cross-bars affixed between the plurality of vertical support bars.

9. The system of claim 1, further comprising a pattern of slots formed on the middle rectangular shelf, the pattern of slots to receive angle iron pieces to secure welding equipment.

10. The system of claim 1, further comprising a plurality of bars affixed to respective edges of the top rectangular shelf, the plurality of bars arranged to form a recess over the top rectangular shelf.

11. The system of claim 1, further comprising a tool-less tank restraint comprising one or more tank receiving recesses, a rotatable cross-bar, and a tightening lever.

12. The system of claim 1, further comprising a telescoping boom configured to telescope from, and retract into, one of the plurality of legs, the telescoping boom further configured to hold one or more cables at a height of the boom.

13. The system of claim 1, further comprising integrated forklift pockets configured to accommodate the forks of a standard forklift.

14. The system of claim 1, further comprising a storage shelf including a plurality of sidewalls.

15. The system of claim 1, wherein the plurality of shelves includes a bottom rectangular shelf.

16. The system of claim 15, further comprising:
   three walls affixed to three edges of the bottom rectangular shelf; and
   a lockable door affixed to a fourth edge of the bottom rectangular shelf, wherein the three walls and the lockable door define an enclosed locker.

17. A welding support system comprising:
   a horizontal top shelf;
   a horizontal bottom shelf;
   a middle rectangular shelf positioned between the top shelf and the bottom shelf, the middle rectangular shelf positioned at an angle relative to the horizontal bottom shelf; and
   a plurality of legs interconnecting the top shelf, the middle rectangular shelf and the bottom shelf, wherein a front edge of the at least one middle rectangular shelf is attached to a pair of the plurality of legs at a first location and a back edge of the at least one middle rectangular shelf is attached to an opposite pair of the plurality of legs at a second location that is lower than the first location.

18. The system of claim 17, further comprising a plurality of wheels attached to lower ends of the respective plurality of legs.

19. A welding support system comprising: a plurality of shelves, including a horizontal, top rectangular shelf and at least one middle rectangular shelf having configurable support components for supporting different configurations of welding equipment, wherein the at least one middle rectangular shelf is positioned below the top rectangular shelf and is angled relative to the horizontal, top rectangular shelf;
   a plurality of legs interconnecting the plurality of shelves; and
   a tool-less tank restraint comprising one or more tank receiving recesses, a rotatable cross-bar, and a tightening lever.

20. The system of claim 19, further comprising a partition formed on the middle rectangular shelf to define a left side and a right side of the middle rectangular shelf, wherein the partition comprises:
   a plurality of vertical support bars affixed to a top surface of the middle rectangular shelf; and
   a plurality of cross-bars affixed between the plurality of vertical support bars.

* * * * *